United States Patent [19]
Bogusch

[11] Patent Number: 4,783,255
[45] Date of Patent: Nov. 8, 1988

[54] SPLIT COUNTERCURRENT FLOW TUBE SETTLER

[76] Inventor: Eugene D. Bogusch, 1421 Bolson Dr., Downers Grove, Ill. 60516

[21] Appl. No.: 803,055

[22] Filed: Nov. 29, 1985

[51] Int. Cl.⁴ .............................................. B01D 21/10
[52] U.S. Cl. ..................................... 210/802; 210/522
[58] Field of Search ........................ 210/521, 522, 802

[56] References Cited

U.S. PATENT DOCUMENTS

| | | | |
|---|---|---|---|
| 3,385,439 | 5/1968 | Bach | 210/522 |
| 3,768,648 | 10/1973 | Anderson et al. | 210/522 |
| 3,837,501 | 9/1974 | Pielkenrood | 210/522 |
| 3,928,209 | 12/1975 | Pahvianen et al. | 210/522 |
| 4,122,017 | 10/1978 | Tanabe | 210/522 |

*Primary Examiner*—Frank Spear
*Attorney, Agent, or Firm*—Augustus G. Douvas

[57] ABSTRACT

The tube settler of this invention is comprised of a plurality of long and narrow tubular passages inclined to the horizontal. The tubular passages have an approximate boomerang cross-sectional shape with the central apex directed upward. Rapid separation of settleable suspended material from a liquid is achieved because of the enforcement of laminar flow and a minimal settling distance within the tubular passages. Improved performance of this settler is attributed to enhanced conveyance of settled solids resulting from reduced upward liquid velocity in the vicinity of the countercurrent solids flow and the utilization of two solids discharge groves in each passageway.

4 Claims, 2 Drawing Sheets

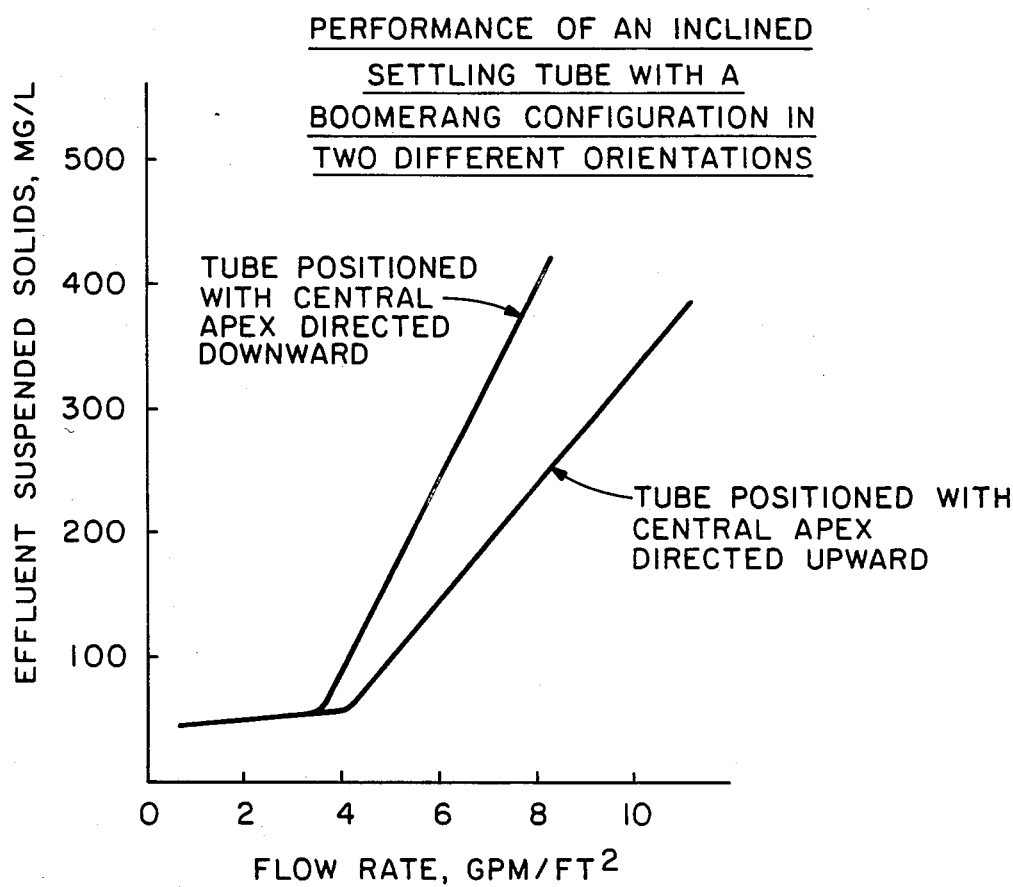
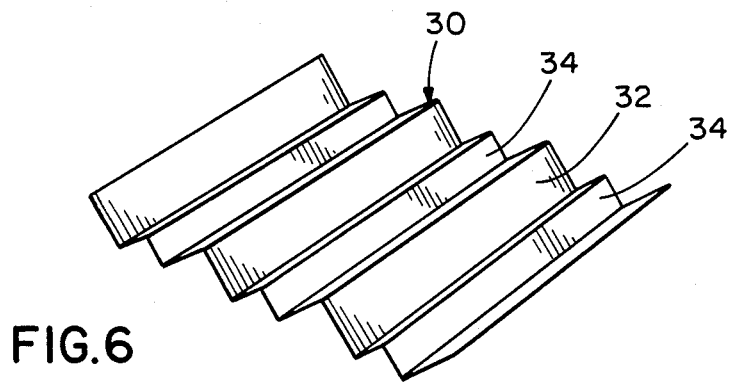
FIG.6
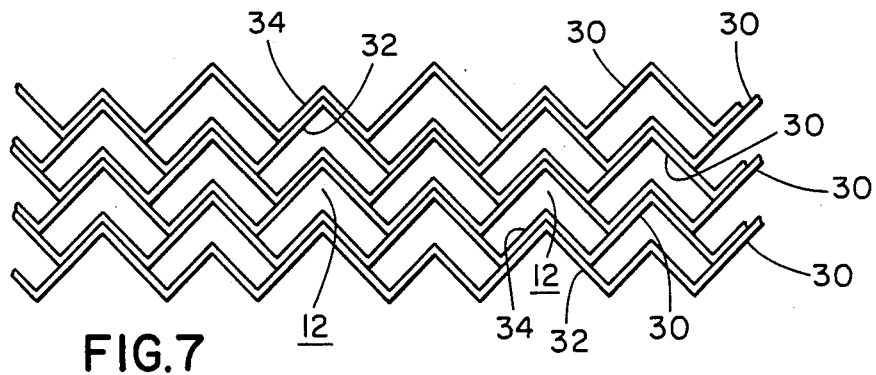
FIG.7

SPLIT COUNTERCURRENT FLOW TUBE SETTLER

FIELD OF INVENTION

This invention relates to an apparatus for the removal of settleable suspended material from a liquid by specific gravity difference.

BACKGROUND OF THE INVENTION

Sedimentation is a physical process frequently used to separate settleable suspended material from a liquid as for example in the treatment of sewage, industrial wastes, process water or drinking water. A tube settler is a device used to accomplish sedimentation consisting of a multiplicity of long and narrow tubes in a systematic alignment. A tube settler operates under two fundamental principles. The first is that laminar flow can be easily maintained in the long passages of small cross-sectional area that characterize a tube settler. Sedimentation rates in a tube settler under conditions of laminar flow are essentially unchanged from sedimentation rates under quiescent conditions. In many conventional sedimentation basins and clarifiers however, sedimentation may be hindered by inlet and outlet turbulence, thermal currents, wind induced currents and inherent unequal flow distribution patterns within the tanks. The effects of these hinderances are a reduction of particles' settling velocities and a reduced true hydraulic retention time.

The second principle of tube settler operation is that a reduction of settling distance will reduce sedimentation time. For a particle settling at its terminal fall velocity, sedimentation time is directly proportional to the vertical settling distance. Since the vertical settling distance in tube settlers is usually about 2 to 4 inches as compared to approximately 12 feet in conventional sedimentation basins and clarifiers, sedimentation time is substantially reduced.

Tube settlers which employ continuous settled solids removal are sharply inclined to provide a downward solids flow which is generally countercurrent to the upward liquid flow. In this countercurrent regime, treated liquid exits at the top end of the settler while the settled solids are discharged at the bottom end.

Many different cross-sectional shapes have been used in tube settler design. The relative efficiencies of various designs have been reported by Anderson et al., U.S. Pat. No. 3,768,648 and Tanabe et al., U.S. Pat. No. 4,122,017. Efficiency of tube settlers is evaluated on the basis of suspended solids removal over a wide range of flow rates. Generally effluent quality will remain at an acceptable level as flow through the tubes is increased until a critical flow rate is reached. As the flow is increased beyond the critical flow rate, effluent quality deteriorates at an accelerated pace. The magnitude of the critical flow rate is dependent on the nature of the suspended material as well as the configuration of the tubular passages. A liquid with suspended solids that settle rapidly will exhibit a higher critical flow rate than the same liquid with suspended solids which settle slowly.

The critical flow rate is probably produced by a combination of many physical factors including: (1) insufficient time for complete settling of the settleable material, (2) an increase in the resuspension of already settled material because of the destablization of countercurrent solids flow, and (3) hindered settling due to localized turbulence at the interface of the countercurrent flow.

A high critical flow rate correlates with greater efficiency in that a tube settler can handle a higher throughput rate without a significant loss of effluent quality. And a tube settler with a high critical flow rate will demonstrate better effluent quality at flows beyond the critical flow rate.

Anderson et al., showed that a settling tube with a chevron configuration in an orientation with the central apex directed downward was more efficient than circular, hexagonal, diamond and square shaped tubes. Improved efficiency was attributed to a uniform maximum settling distance within the chevron tube and a concentration of solids along the central collection groove at the bottom of the chevron tube.

Tanabe et al., demonstrated a modification of the chevron tube design utilized by Anderson et al. which was termed a boomerang configuration. In this design which approximates the shape of a boomerang, the vertical side walls found in the chevron of Anderson et al. are more outwardly disposed toward their lower ends. This modification according to Tanabe et al. eliminates the acute angle normally found in the chevron design between the tube's top walls and vertical side walls. Increasing this angle reduces localized boundary effects thereby allowing a slightly higher rate of flow in this region of the tube. According to Tanabe et al. the boomerang cross-section permits a higher critical flow rate through the tube resulting in improved treatment efficiency, as demonstrated by increased turbidity removal at flow rates exceeding the critical flow rate of the chevron.

An analysis of liquid velocity gradients present in tubes with either a chevron or boomerang cross-section shows that the highest flow rate occurs between the center apices of the top and bottom walls directly above and in close proximity to the central groove where settled solids are collected. A large velocity gradient is created between the point of maximum liquid velocity and the countercurrent flow of solids, adversely affecting the efficiency of both of these tubes. The large sheer stress exerted by the upflowing liquid on the settled solids opposes the gravitational force acting to pull the settled solids downward. Consequently the settled solids are hindered in their downward movement and may be subject to resuspension.

SUMMARY OF THE INVENTION

In this invention a boomerang tube cross-section is utilized with the tubes oriented so that the central apex of the boomerang is directed upward. In this orientation solids are collected in grooves away from the central region of maximum liquid velocity. Thus the settled solids are less hindered in their downward movement and less likely to undergo resuspension. This orientation provides two grooves for solids collection making it more efficient at higher throughput rates, more efficient for treating liquids with higher suspended solids concentrations and more efficient in treating liquids with slow settling suspended solids. In addition, the tubes of this invention are less susceptable to clogging, which is occasionally encountered with other tube configurations.

This invention is compact and inexpensive to manufacture from lightweight rigid or semi-rigid plastic materials. When the settler is installed in conventional clarifiers or sedimentation basins, settler modules would be installed just below the the liquid surface in a location convenient to effluent removal in existing collection troughs. The solids discharged from the settler modules fall to the bottom of the basin and are removed by the means of solids removal already provided. The use of this invention in any existing settling basin will increase the basin's treatment capacity in terms of the maximum volume of liquid treatable with acceptable effluent quality. The efficiency of suspended solids removal at all treatable flows is also likely to be increased. In treatment facilities already utilizing less efficient tube settlers or inclined parallel plate separators, conversion to the tube settlers of this invention could be easily made.

This invention has many applications. In the treatment of sewage for example, this invention may be used for sedimentation of settleable solids from raw sewage, clarification of mixed liquor from an activated sludge process, polishing of an activated sludge effluent and clarification of a chemically flocculated sewage effluent. Similar applications may be found in the treatment of many industrial wastes and in the treatment of drinking water. Further objects and advantages of my invention will become apparent from consideration of the drawings and ensuing descriptions therein.

BRIEF DESCRIPTION OF THE DRAWINGS

FIG. 5 is a plot of effluent suspended solids versus flow rate for the tube configuration shown in FIG. 2 and the same tube oriented in an inverted position.

FIG. 6 is a perspective view illustrating the type of corrugated sheet which can be used to make tube settler of this invention.

FIG. 7 is a partial end view of the flow passages of a tube settler of this invention constructed with the corrugated sheets illustrated in FIG. 6.

DESCRIPTION OF THE PREFERRED EMBODIMENTS

Figure 1:
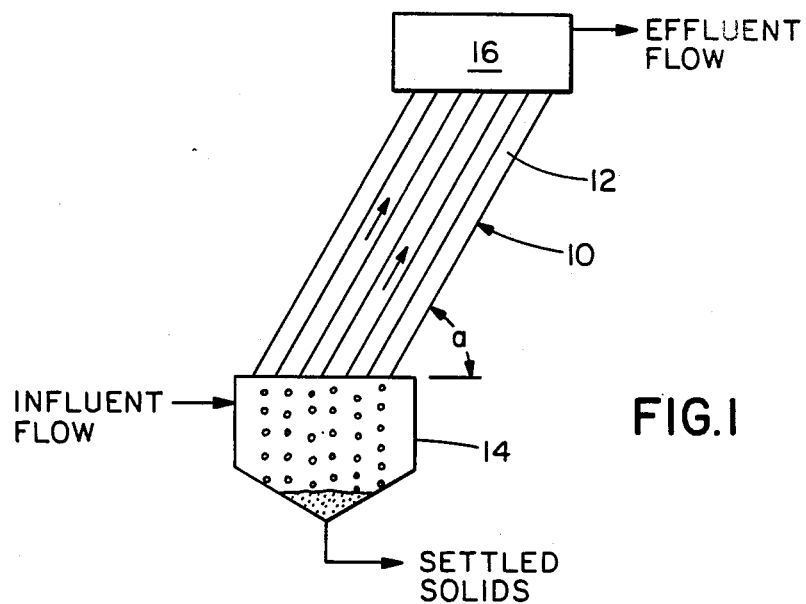
FIG. 1 is a schematic diagram of a typical water clarification apparatus employing the tube settler of this invention.

FIG. 1 shows a typical example of the tube settler 10 of this invention. However, the scope of the invention is not limited to this example. The tube settler 10 consists of a multiplicity of long and narrow tubular passages 12 having the cross-sectional configuration of this invention. The tubular passages 12 are placed in a parallel and systematic alignment and are inclined at an angle a to the horizontal.

The influent liquid containing suspended material is introduced into the solids collection compartment 14 which is located beneath the tube settler 10. As the liquid to be treated flows upward through the tubular passages 12 of the settler 10 the settleable suspended material settles to the bottom of the tubular passages 12. The angle a at which the tubes 12 are inclined is greater than the angle of repose of the settled material allowing gravitational attraction to move the settled material in a downward direction along the bottom of the tubular passages 12. The settled material is eventually discharged at the bottom or influent end of the tube settler 10 and is accumulated in the lower portion of the solids collection compartment 14. The solids in the solids collection compartment 14 are removed either on a periodic or continuous basis. The clarified liquid leaves the tube settler 10 at the top end and is collected in an effluent collection compartment 16. The clarified effluent is usually removed continuously from the effluent collection compartment 16 by pump or gravity.

Although the tube settler 10 will often be deployed in specially designed tanks it may also be used in conventional sedimentation basins or clarifiers. In a conventional settling basin tube settler modules 10 would be arranged in compact arrays not far below the liquid surface. The basin's existing means of solids removal would be used for removal of the solids discharged from the tube settlers 10. The basin's existing effluent collection troughs would be utilized for collection of the tube settler effluent. Some partioning in the settling basin would be required to insure that all liquid leaving the settling basin had passed through the tube settlers 10. The partioning in effect achieves the same schematic flow pattern as shown in FIG. 1. That is, the partitioned area below the tube setler modules 10 serves as the solids collection compartment 14 while the partitioned area above the modules 10 serves as the effluent collection compartment 16.

Installation of this invention in an existing settling basin will increase the basin's treatment capacity. Tube settlers 10 would increase the hydrualic capacity the the basin while maintaining an acceptable level of effluent quality. And at any given liquid throughput the tube settlers 10 of this invention will increase suspended solids removal in the settling basin. In basins already equipped with other types of tube settlers or inclined parallel plate separators conversion to the more efficient tube settler 10 of this invention would be relatively easy.

Figure 2:
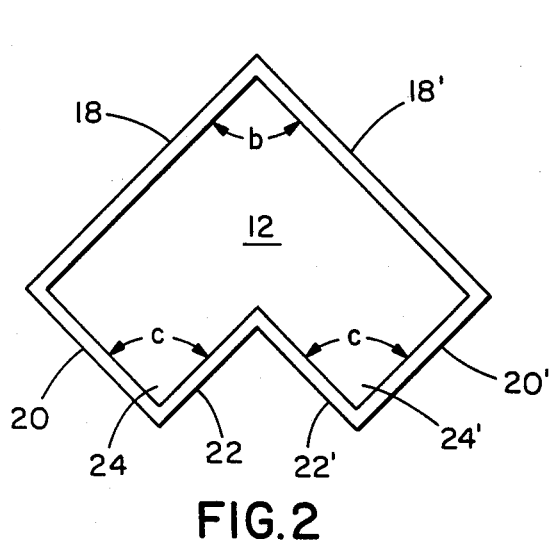
FIG. 2 is an end view illustrating the configuration of a typical single tubular passage in the tube settler shown in FIG. 1.

FIG. 2 shows the boomerang configuration of a single passageway 12 in the tube settler 10 depicted in FIG. 1. The top of each passageway 12 is formed by the two broad sides 18 and 18' butted laterally edge-to-edge so as to define a certain included angle b downwardly. Extending downwardly from the lower lateral edge of each broad side 18, 18' is an inclined side 20, 20'. Each inclined side 20, 20' is parallel to the far broad side 18, 18'. Each inclined side 20, 20' is joined at its lower lateral edge to a narrow side 22, 22' extending upwardly. Each narrow side 22, 22' is parallel to the broad side 18, 18' above it. The narrow sides 22 and 22' are joined together edge-to-edge forming a bottom wall and completing the tubular configuration. Note that each inclined side 20, 20' adjoins a broad side 18, 18' of the top wall and the parallel narrow side 22, 22' of the bottom wall. Note also the included angles c formed between each inclined side 20, 20' and narrow side 22, 22' are equal, and these angles c are equal to the angle b included by the top wall. Each inclined side 20, 20' and the adjacent narrow side 22, 22' form a solids collection grove 24, 24'.

The preferred dimensions for the tubular configuration shown in FIG. 2 are as follows. The included angle c of each solids collection groove 24, 24' is preferably 90 degrees but may range from approximately 60 to 120 degrees. The separation between the top and bottom walls is usually about 2 inches but may range from about 1 to 4 inches. The broad sides 18 and 18' of the top wall and the narrow sides 20 and 20' of the bottom wall, may extend laterally from about 1 to 8 inches. The length of the tubular passageways 12 as depicted in FIG. 1 may vary from about 1 to 4 feet. The tubular passageways 12 are steeply inclined at an angle a of about 45 to 60, degrees but the inclination may vary somewhat depending on the angle of repose of the settled solids.

Figure 3:
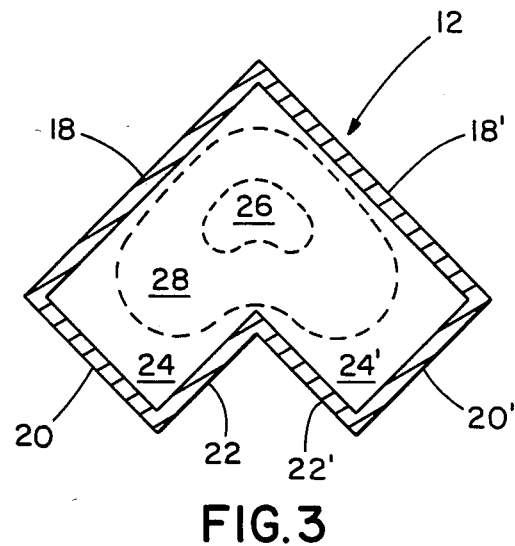
FIG. 3 is a cross-sectional view showing approximate liquid velocity gradients present in a typical single tubular passage of the tube settler depicted in FIG. 1.

FIG. 3 shows estimated velocity gradients within a single tube 12 having a boomerang configuration under full laminar flow of a liquid with no settleable material. The orientation and inclination of the tube 12 does not effect the velocity gradients shown in FIG. 3. The inner dashed line encloses the region of liquid flow having 95 to 100% of the maximum liquid velocity 26. The outer dashed line encloses the region of liquid flow with a velocity greater than 50% of the maximum liquid velocity 28. The estimates of velocity gradients as shown in FIG. 3 were made on the following basis. In a circular conduit at full laminar flow, maximum liquid velocity occurs at the center and decreases parabolically to zero at all points of the inside boundary surface. Similarly, in the boomerang configuration the maximum liquid velocity must occur between the apices of the top and bottom walls as this region is most distant from any boundary surfaces. Likewise, the liquid velocity at any boundary surface of the boomerang configuration must decrease to zero. It was assumed that the tendency exists for the velocity to decrease parabolically from the area of maximum velocity to any boundary surface. Also, the interactive effects on velocity of all boundary surfaces in the angularly shaped boomerang configuration were considered.

The flow of a liquid carrying settleable material through the tube 12 depicted in FIG. 3 will result in some alteration of the velocity gradients shown because of the development of the countercurrent solids flow. However, it is assumed that for a liquid with relatively moderate settleable solids concentrations the general nature of the velocity gradients shown in FIG. 3 will remain essentially unchanged.

In the boomerang configuration of Tanabe et al. with the center apex directed downward, as in the inverted view of FIG. 3, the solids are collected directly below the region of maximum liquid velocity 26. The large velocity gradient present above the single centrally located solids collection groove hinders solids removal in several ways. The large sheer stress exerted by the upflowing liquid on the settled solids opposes the gravitational force acting to pull the settled solids downward. The downward movement of the settled solids can be slowed by the presence of this large velocity gradient. The large velocity gradient can also cause local turbulence at the interface of the countercurrent flow and hinder sedimentation as well as induce a resuspension of already settled solids.

In the boomerang configuration with the upward directed central apex of this invention, as shown in FIGS. 2 and 3, solids are collected in the dual bottom grooves 24 and 24'. The regions surrounding the solids collection grooves 24 and 24' have relatively low upward liquid velocities. Hence, in this orientation, the sedimentation of the solids and the downward conveyance of the solids are less hindered because of the decreased velocity gradients near the dual bottom grooves 24 and 24'. In addition, the dual solids collection grooves 24 and 24' are capable of conveying more solids than a single groove which makes the configuration of this invention more efficient under conditions of high flow and increased suspended solids concentrations.

Figure 4:
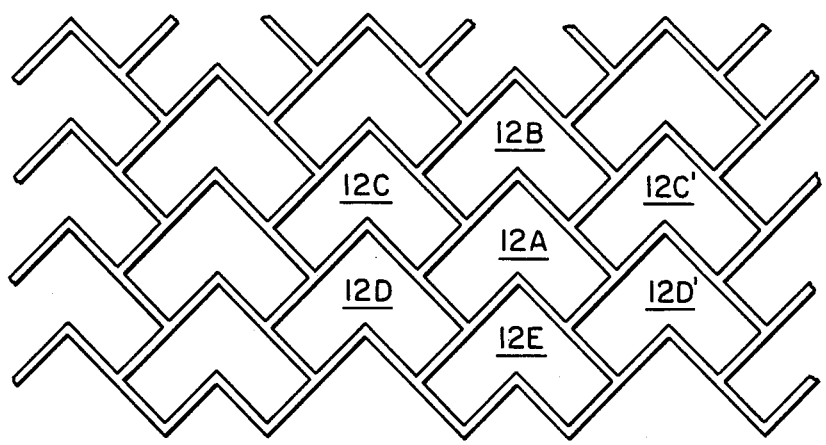
FIG. 4 is a partial end view of the tubular flow passages used in the tube settler of this invention.

FIG. 4 is a partial end view of the tube settler 10 of this invention, each tube 12 having the boomerang cross-sectional configuration with the central apex directed upward. As can be seen in FIG. 4 the tubes 12 are arranged in compact, parallel and systematic alignment. With respect to one particular passage 12A, the center portion of the top of the passage 12A corresponds with the bottom of a passage 12B located directly above and the side portions of the top of passage 12A correspond with the inclined sides 20 and 20' of the adjacent higher passages 12C and 12C'. The inclined sides 20 and 20' of passage 12A correspond with the side portions of the tops of adjacent lower passages 12D and 12D'. And finally, the bottom of passage 12A corresponds with the center portion of top of the immediate lower passage 12E. Settler modules 10 can be constructed to any desired size and are constructed so that the passages 12 are disposed at an angle a to the horizontal.

The following tests were conducted to demonstrate the improved performance of the boomerang configuration having an upward directed central apex. A tube 12 with a boomerang cross-sectional shape as depicted in FIG. 2 was constructed of acrylic plastic. It had a cross-sectional area of 5.66 square inches and a length of 2 feet. All enclosed angles were 90 degrees except the 270 degree angle formed inside the tube 12 at the juncture of the two narrow sides 22 and 22'. The cross-sectional dimensions as depicted in FIG. 2 measured 2.71 inches for the broad sides 18 and 18', 1.30 inches for the narrow sides 22 and 22', and 1.41 inches for the inclined sides 20 and 20'.

The tube was positioned in a tank at an angle of 60 degrees from the horizontal. The settling tube could be positioned either with the central apex of the boomerang configuration directed upward or downward. The effluent end of the tube was positioned just above the water surface. A siphon line was placed in the tube's effluent end to accurately control the rate of flow through the tube and provide effluent samples.

The test water to be treated contained 550 mg/l bentonite clay and 0.2 mg/l of a polymeric flocculant. A mixer in the tank was used to keep the suspended material at a uniform concentration throughout the tank. An overflow outlet was used in the tank to maintain a constant liquid level. All water and suspended material withdrawn from the tank by either the overflow or the siphon in the settling tube were collected and pumped back into the tank so that each test was run with the same test water. Each flow rate was maintained for at least 30 minutes to attain equilibrium conditions before an effluent sample was withdrawn.

FIG. 5 gives a comparison of settling performance for a tubular passage with the boomerang configuration of this invention with the central apex directed upward, and a tubular passage with the boomerang configuration of Tanabe et al. with the central apex pointed downward. In this graph liquid flow rates through the tube are plotted on the horizontal axis versus effluent suspended solids on the vertical axis. In both curves shown in FIG. 5 the critical flow rate is well defined. The critical flow of the upward directed boomerang configuration of this invention was 4.2 gpm/sq ft while in the downward directed boomerang configuration the critical flow was only 3.6 gpm/sq ft. The critical flow rate of this invention is therefore 17% higher than the boomerang configuration having a downward directed central apex.

Although tube settlers are not ordinarily designed to operate at flow rates beyond the critical flow rate such situations may frequently occur, particularly in sewage or industrial waste treatment plants where influent flow cannot always be regulated below the maximum design flow. FIG. 5 shows that the upward directed boomerang configuration of this invention achieved a 40% decrease in effluent suspended solids over the results obtained for the downward directed boomerang configuration for flow rates exceeding the critical flow rate. This represents a significant improvement in performance in the flow range of 3.6 to 10 gpm/sq ft.

The overall improved performance of the tube settler of this invention verifies the already stated advantages of the upward directed boomerang design which are: (1) collection of solids away from the area of maximum upward liquid velocity, and (2) dual grooves for collection and discharge of settled solids. Referring to FIGS. 2 and 3, these advantages may be accentuated by using a boomerang configuration having narrow sides 22 and 22' which are longer than the inclined sides 20 and 20'. This lengthens the boomerang configuration causing a greater separation of the region of the maximum flow 26 and the solids collection grooves 24 and 24'.

While solids frequently have an angle of repose of about 40 to 45 degrees, countercurrent tube settlers are generally inclined at 55 to 60 degrees. Since the tube configuration of this invention minimizes the countercurrent hinderance of settled solids flow, it may be possible in many applications to utilize the tube settler 10 of this invention at an angle of inclination a somewhat less than that required by conventional tube settlers. A reduction of the inclination angle a from 60 to 50 degrees for example, would reduce the vertical settling distance by 22%. The time required for sedimentation would also be reduced since sedimentation time is proportional to vertical settling distance for particles settling at their terminal fall velocity.

The tube settler 10 of this invention may be constructed in various ways. A simple and low cost construction procedure is to utilize corrugated sheets 30 of the type shown in FIG. 6. Although the tube settler 10 may be constructed of many rigid materials such as plastics, fiberglass or metals, plastics are preferred materials of construction because they are lightweight, strong and economical. The corrugated sheet 30 is comprised of alternating large corrugations 32 and small corrugations 34. The large corrugations 32 form the top walls of the boomerang cross-sectional configuration and the small corrugations 34 form the bottom walls. The corrugated sheets 30 are layered upon one another so that on each large corrugation 32 of a lower sheet is seated the backside of a small corrugation 34 of an upper sheet as shown in FIG. 7. The tubular passages 12 having the upward directed boomerang cross-sectional configuration of this invention are formed between the large corrugation 32 of an upper sheet and the small corrugation 34 of the sheet directly below it.

Settler modules 10 can be constructed to any desired size. Design parameters include the size of the corrugated sheets 30, the resultant cross-sectional dimensions of each passageway 12, the number of corrugated sheets 30 used in each tube settler module 10 and the angle of inclination a the corrugated sheets 30 are set at. The stacked corrugated sheets 30 can be fixed in place in many ways including adhesives and mechanical fasteners. Metal corrugated sheets 30 can also be soldered or welded together. When assembled the settler module 10 is in the form of a rhomboid with all tubular passages 12 being in parallel alignment, of equal length and at the same angle of inclination a.

In the foregoing description the invention has been described with reference to certain particular preferred embodiments, though it is to be understood that the specific details shown are merely illustrative and that the invention may be carried out in other ways without departing from the true spirit and scope of the appended claims.

What is claimed is:

1. In a tube settler for removing material suspended in a liquid by sedimentation, the material having a specific gravity greater than the liquid, while the liquid being treated is passed upward through the settler in which the settler has means located at the bottom of the settler for continuously introducing liquid containing suspended material to an influent end of said settler, means located at the top of the settler for leading liquid away from an effluent end of said settler, means located at the bottom of the settler for collecting and removing settled material discharged from the influent end of said settler, and a multiplicity of tubes defining long tubular passages of an approximate boomerang cross-sectional configuration in a plane normal to the longitudinal axis of each of the tubular passages arranged compactly and parallel to one another under a certain systematic cross-sectional alignment and positioned in an inclined relation to the horizontal, the improvement comprising each tube defining a tubular passage comprising two broad top sides of equal length and width butted laterally edge-to-edge with the two broad top sides forming a top wall with an upwardly directed apex in the cross-sectional plan normal to the longitudinal axis of each of the tubular passages, two inclined sides forming side walls of equal length and width, with each inclined side extending from the lower lateral edge of a different one of said broad sides in parallel relation to the other of said broad sides and in a direction in which an extension of each said inclined side intersects an extension of the other inclined side, and two narrow bottom sides of equal length and width forming a bottom wall with each narrow side extending upwardly in the normal plane from the lower lateral edge of a different one of the inclined sides in parallel relation to one of said broad sides and butted with the other narrow side edge-to-edge, and with the two narrow sides and the adjoining inclined sides defining two grooves within each tubular passage wherein material separated from liquid under treatment is collected and transported downward.

2. The apparatus for separating suspended material from a liquid by specific gravity difference as defined in claim 1 wherein the included angle defined by each inclined side and the adjacent narrow side of each tubular passage ranges between 60 and 120 degrees.

3. The apparatus for separating suspended material from a liquid by specific gravity difference as defined in claim 1 wherein a multiplicity of said tubular passages of approximate boomerang cross-sectional configuration are disposed under such systematic arrangement whereby with respect to each said passage, the center portion of said top wall corresponds to said bottom wall of a passage immediately above, and the side portions of said top wall correspond to said inclined sides of adjacent higher passages, said inclined sides correspond to side portions of said top walls of adjacent lower passages, and said bottom wall corresponds to the center portion of said top wall of a passage immediately below.

4. A method for separating by gravity settleable suspended material from a liquid, the material having a specific gravity greater than the liquid, with a tube settler having a lower influent end and an upper effluent end interconnected by a plurality of inclined tubes each defining a long tubular passage with a cross-sectional configuration approximately the shape of a boomerang consisting of a central apex of the boomerang passage directed upwardly, and a pair of collection grooves of the boomerang passage directed downwardly with each groove being symmetrically spaced on opposite sides of the central apex, comprising the steps of introducing liquid containing settleable suspended material to the influent end of said settler, flowing said liquid through said passages at a laminar rate of flow whereby said suspended material settles out on the upward facing surfaces within said passages with the settled material being collected within the collection grooves of said passages, transported downward through said settler collection grooves and discharged from said settler while said liquid is flowing therethrough, and leading said liquid away from said effluent end of said settler.

* * * * *